US012688495B2

(12) United States Patent
Shin et al.

(10) Patent No.: US 12,688,495 B2
(45) Date of Patent: Jul. 21, 2026

(54) VEHICLE AND CONTROL METHOD OF VEHICLE

(71) Applicants: Hyundai Motor Company, Seoul (KR); Kia Corporation, Seoul (KR)

(72) Inventors: Dongchan Shin, Seoul (KR); Seungjae Lee, Gwangmyeong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 104 days.

(21) Appl. No.: 18/641,269

(22) Filed: Apr. 19, 2024

(65) Prior Publication Data

US 2025/0069061 A1     Feb. 27, 2025

(30) Foreign Application Priority Data

Aug. 25, 2023    (KR) ........................ 10-2023-0112152

(51) Int. Cl.
| | |
|---|---|
| *G06Q 20/14* | (2012.01) |
| *G01C 21/36* | (2006.01) |
| *G06Q 20/20* | (2012.01) |
| *G06Q 20/32* | (2012.01) |
| *G06Q 20/34* | (2012.01) |
| *G06Q 40/02* | (2023.01) |
| *G07B 15/06* | (2011.01) |

(52) U.S. Cl.
CPC ......... *G06Q 20/354* (2013.01); *G06Q 20/352* (2013.01); *G07B 15/063* (2013.01); *G06Q 2240/00* (2013.01)

(58) Field of Classification Search
CPC ............... G06Q 20/354; G06Q 20/352; G06Q 2240/00; G06Q 20/145; G06Q 20/227; G06Q 20/308; G06Q 20/32; G06Q 20/34; G06Q 20/341; G06Q 40/02; G07B 15/063; G01C 21/3697
USPC ........................................................... 705/41
See application file for complete search history.

(56) References Cited

U.S. PATENT DOCUMENTS

| | | | | |
|---|---|---|---|---|
| 10,475,255 B2 * | 11/2019 | Peeters | ................. | G08G 1/017 |
| 2018/0158254 A1 * | 6/2018 | Fustes | ..................... | H04W 4/02 |
| 2023/0169504 A1 * | 6/2023 | Bergeron | ............... | G06K 7/087 |
| | | | | 705/75 |

FOREIGN PATENT DOCUMENTS

| | | | | | |
|---|---|---|---|---|---|
| KR | 20090119611 A | * | 11/2009 | ............. | G06Q 20/24 |

* cited by examiner

*Primary Examiner* — Clifford B Madamba
(74) *Attorney, Agent, or Firm* — Banner & Witcoff, Ltd.

(57) ABSTRACT

A vehicle may include: an Electronic Toll Collection System (ETCS) terminal including a card Integrated Circuit (IC) chip; and a head unit connected to the ETCS terminal via a vehicle network, wherein the head unit may be configured to: obtain a remaining distance to an ETCS payment location, based on the remaining distance being less than a preset distance, determine whether the ETCS terminal is issuing a new card or deleting an issued card, based on a determination that the ETCS terminal is issuing the new card or deleting the issued card, allow the ETCS terminal to stop an ongoing card issuance operation or an ongoing card deletion operation, and allow the ETCS terminal to change a payment card of the ETCS terminal to a card usable for payment from among cards stored in the card IC chip.

20 Claims, 12 Drawing Sheets

Figure 3:
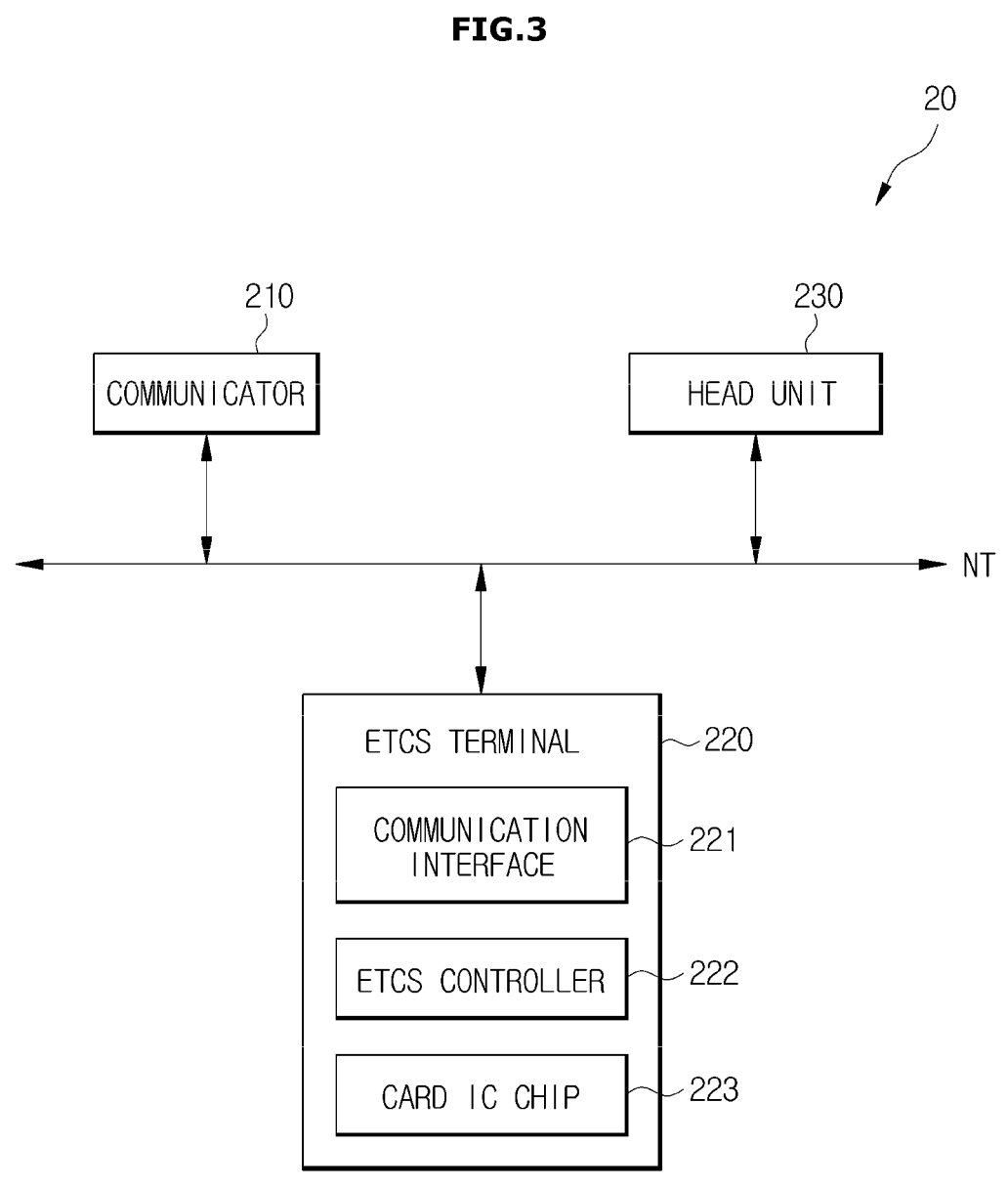

| COMMUNICATOR |

| HEAD UNIT |

NT

ETCS TERMINAL                    220

| COMMUNICATION INTERFACE |      221

| ETCS CONTROLLER |              222

| CARD IC CHIP |                223

VEHICLE AND CONTROL METHOD OF VEHICLE

CROSS-REFERENCE TO RELATED APPLICATION

This application is based on and claims priority to Korean Patent Application No. 10-2023-0112152, filed on Aug. 25, 2023 in the Korean Intellectual Property Office, the disclosure of which is incorporated herein by reference.

TECHNICAL FIELD

The disclosure relates to a vehicle applied to an Electronic Toll Collection System (ETCS), and a control method thereof.

BACKGROUND

An Electronic Toll Collection System (ETCS) (e.g., HI-PASS for expressways in South Korea, E-ZPass in the U.S., or any other toll payment systems configured for use in other countries) is a system for automatically collecting tolls by using a standardized application interface of a dedicated short-range communication protocol in order to reduce traffic delays.

That is, the ETCS is a system capable of automatically transmitting and receiving toll information between roadside equipment and a terminal of a vehicle (e.g., on-board equipment or ETCS terminal), based on dedicated short-range communication technology.

For toll transaction processing, after a vehicle enters a toll area, the ETCS recognizes a class of vehicle by a vehicle classification device, and transmits information through a transmission and reception antenna on a lane by linking to a terminal installed in the vehicle.

Instead of inserting a credit card into an ETCS terminal, a card Integrated Circuit (IC) chip that is embedded may be deployed in an ETCS terminal, and card information issued by a card company may be input to the card IC chip, thereby preventing structural restrictions or theft risk that may be caused when using a physical payment card.

Multiple cards may be issued to the IC chip of the ETCS terminal. However, payment with ETCS such as HI-PASS may not be made using another issued card while a new card is being issued or an issued card is being deleted.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

An aspect of the disclosure provides a vehicle that may perform payment with ETCS, even during issuance of a new card or deletion of an issued card, and a control method thereof.

Additional aspects of the disclosure will be set forth in part in the description which follows and, in part, will be obvious from the description, or may be learned by practice of the disclosure.

A vehicle may comprise: an Electronic Toll Collection System (ETCS) terminal including a card Integrated Circuit (IC) chip; and an apparatus connected to the ETCS terminal via a vehicle network, wherein the apparatus is configured to: obtain a remaining distance to an ETCS payment location, based on the remaining distance being less than a preset distance, determine whether the ETCS terminal is issuing a new card or deleting an issued card, based on a determination that the ETCS terminal is issuing the new card or deleting the issued card, control the ETCS terminal to stop an ongoing card issuance operation or an ongoing card deletion operation, and control the ETCS terminal to change a payment card of the ETCS terminal to a card usable for payment from among cards stored in the card IC chip.

The apparatus may be configured to obtain the remaining distance by: obtaining a remaining distance to an ETCS payment location located within a preset area from a location of the vehicle based on map information of a navigation device, or obtaining a remaining distance to an ETCS payment location located on a travel route based on travel route information to a destination obtained by the navigation device.

The ETCS payment location may comprise at least one of a location of a tollgate or a location accepting ETCS payment.

Based on a determination that the ETCS terminal is issuing the new card, the apparatus may be configured to transmit, to the ETCS terminal, a card issuance stop request to stop issuing the new card, and the ETCS terminal is configured to stop the ongoing card issuance operation, in response to receiving the card issuance stop request, and the ETCS terminal is configured to change the payment card to the card usable for payment from among the cards stored in the card IC chip.

Based on a determination that the ETCS terminal is deleting the issued card, the apparatus may be configured to transmit, to the ETCS terminal, a card deletion stop request to stop deleting the issued card, and the ETCS terminal is configured to stop the ongoing card deletion operation, in response to receiving the card deletion stop request, and the ETCS terminal is configured to change the payment card to the card usable for payment from among the cards stored in the card IC chip.

The ETCS terminal may comprise: a communication interface communicatively connected to the vehicle network; a card Integrated Circuit (IC) chip configured to store the issued card; and an ETCS controller configured to control the communication interface and the card IC chip, wherein the ETCS controller is configured to: in response to receiving, by the ETCS terminal, a card issuance stop request to stop issuing the new card or a card deletion stop request to stop deleting the issued card while the ETCS terminal is in a process of issuing the new card or deleting the issued card, stop the ongoing card issuance operation or the ongoing card deletion operation, change the payment card to the card usable for payment from among the cards stored in the card IC chip, and control the communication interface to perform an ETCS payment process at the ETCS payment location using the card usable for payment.

The ETCS controller may be configured to control, based on receiving the card issuance stop request or the card deletion stop request, the communication interface to terminate a communication session for the ongoing card issuance operation or the ongoing card deletion operation.

The apparatus may be configured to: based on receiving payment completion information indicating completion of an ETCS payment process, receive, from a server, first message information about the stopped card issuance operation or second message information about the stopped card deletion operation, and transmit the first message information or the second message information to the ETCS terminal.

The ETCS terminal may be configured to resume the stopped card issuance operation according to the first message information, or resume the stopped card deletion operation according to the second message information.

The apparatus may be configured to transmit a notification signal indicating a payment card change, in response to receiving card change completion information indicating completion of the payment card change from the ETCS terminal.

These and other features and advantages are described in greater detail below.

BRIEF DESCRIPTION OF THE DRAWINGS

These and/or other embodiments of the disclosure will become apparent and more readily appreciated from the following description of the embodiments, taken in conjunction with the accompanying drawings of which:

FIG. 3 is a control block diagram of a vehicle;

DETAILED DESCRIPTION

Figure 1:
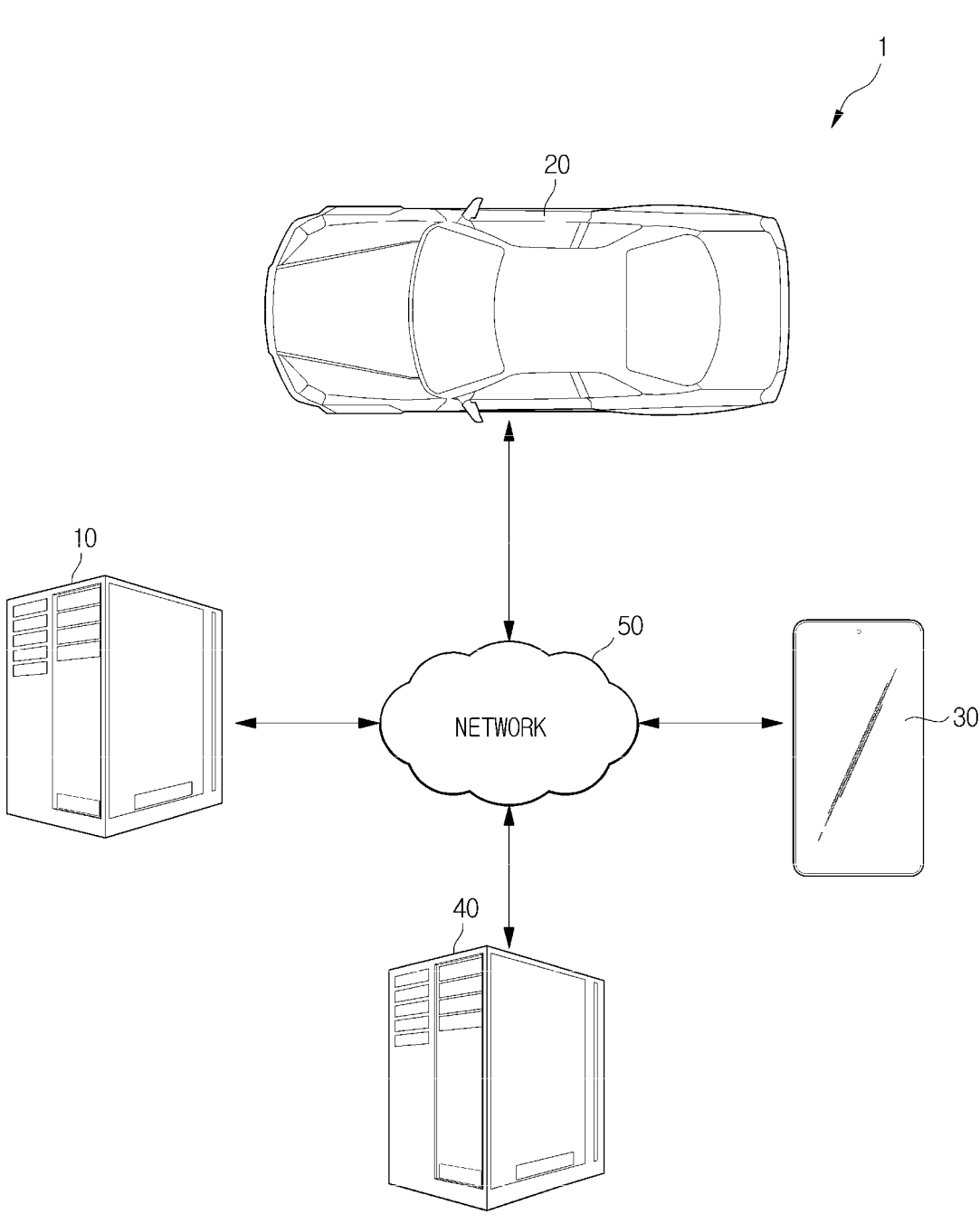
FIG. 1 illustrates an Electronic Toll Collection System (ETCS) associated with a vehicle.

Like reference numerals throughout the specification denote like elements. Also, this specification does not describe all the elements according to examples of the disclosure, and descriptions well-known in the art to which the disclosure pertains or overlapped portions are omitted. The terms such as "~part", "~member", "~module", "~device", and the like may refer to at least one process processed by at least one hardware or software. According to various aspects of the present disclosure, a plurality of "~parts", "~members", "~modules", "~devices" may be embodied as a single element, or a single of a "~part", "~member", "~module", "~device" may include a plurality of elements.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but does not preclude the presence or addition of at least one other features, integers, steps, operations, elements, components, and/or groups thereof.

It will be understood that when it is stated in this specification that a member is located "on" another member, not only a member may be in contact with another member, but also still another member may be present between the two members.

It will be understood that, although the terms first, second, etc. may be used herein to describe various elements, these elements should not be limited by these terms. It is to be understood that the singular forms are intended to include the plural forms as well, unless the context clearly dictates otherwise.

Reference numerals used for method steps are just used for convenience of explanation, but not to limit an order of the steps. Thus, unless the context clearly dictates otherwise, the written order may be practiced otherwise.

FIG. 1 illustrates an Electronic Toll Collection System (ETCS) associated with a vehicle.

Referring to FIG. 1, the ETCS 1 may include a server 10 providing a Connected Car Service (CCS) for vehicles, a vehicle 20 including an ETCS terminal, a user terminal 30 (e.g., a mobile device, etc.), and a card company server 40 issuing a card to the ETCS terminal.

The server 10, the vehicle 20, the user terminal 30, and the card company server 40 may each be connected to a network 50 by wire and/or wirelessly, and may transmit and receive data to and from each other through the network 50.

In response to receiving a card issuance request from the user terminal 30, the server 10 may transmit the card issuance request to the card company server 40. The server 10 may receive card information from the card company server 40, and transmit a card issuance command, which includes a security key and the card information, to the vehicle 20.

In response to receiving a card deletion command from the card company server 40, the server 10 may transmit a card deletion command including an authorization key to the vehicle 20.

The server 10 may match and store customer information with card management information of a card issued to the vehicle, thereby managing a card issuance state. In this instance, the server 10 may update the customer information and the card management information in case of a change in the card (new card issuance or card deletion).

In response to receiving the card issuance command or the card deletion command from the server 10, the vehicle 20 may transmit the card issuance command or the card deletion command to the ETCS terminal.

The ETCS terminal of the vehicle 20 may issue a card to a card Integrated Circuit (IC) chip by generating a Supplementary Security Domain (SSD) and an applet based on the card issuance command, or may delete the card issued to the card IC chip by deleting an SSD and an applet based on the card deletion command.

In this instance, the ETCS terminal may include a card IC chip that may issue or delete a card via Over The Air (OTA).

The ETCS terminal may perform a payment process with ETCS (e.g., HI-PASS) (hereinafter, refer to as "perform ETCS payment") by changing a payment card to a card usable for payment from among the card IC chips storing one or more issued cards.

The user terminal 30 may receive an input from a driver (user) of the vehicle 20. For example, the user terminal 30 may receive an input for issuing a new card or an input for deleting an issued card, and may transmit a card issuance request or a card deletion request to the server 10 based on the input.

The card company server 40 may generate card information about a card to be issued to the card IC chip of the ETCS terminal, and transmit the card information to the server 10. The card company server 40 may transmit the card deletion request to the server 10, for example, if a validity period of card expires (e.g., the card has reached the expiration date) or a toll is not paid.

The server 10 may control a process of issuing a card to the card IC chip of the ETCS terminal or deleting an issued card, thereby managing the card of the ETCS terminal.

Figure 2:
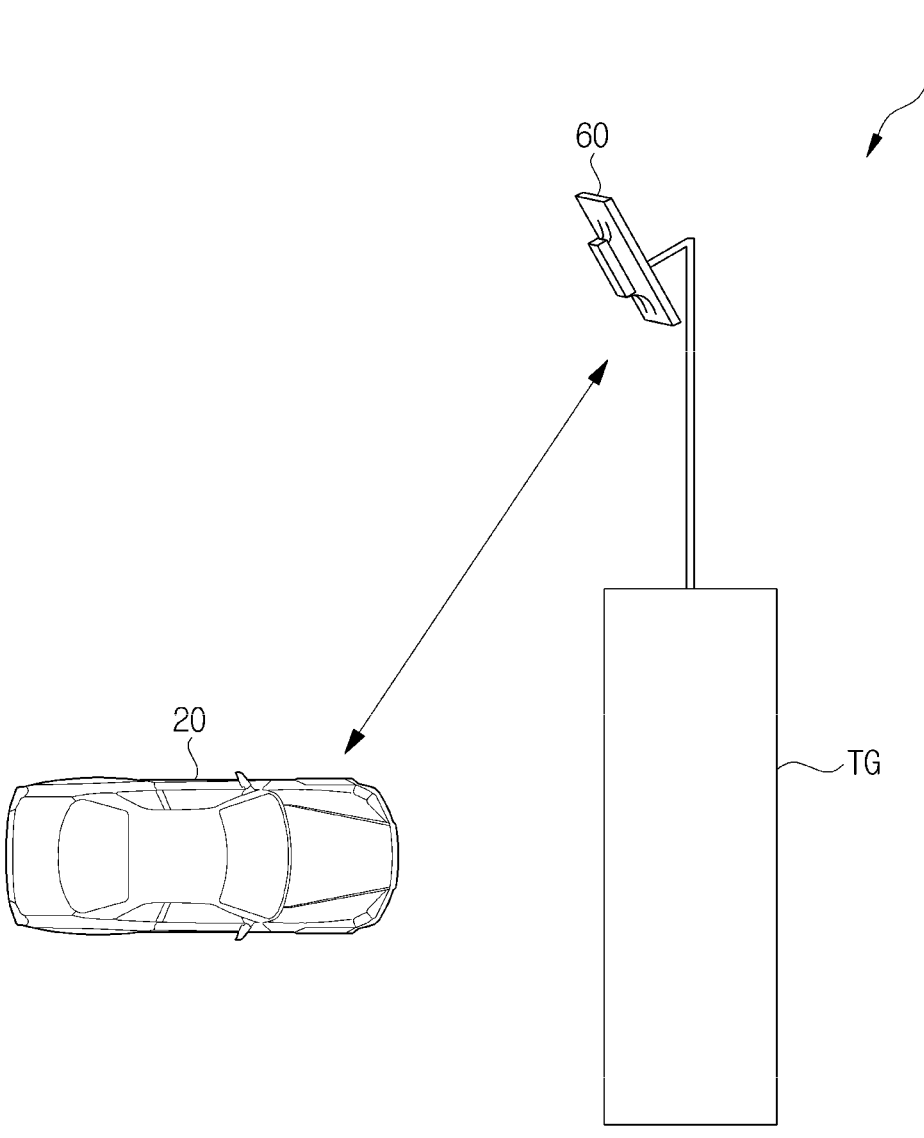
FIG. 2 illustrates a vehicle approaching a tollgate.

FIG. 2 illustrates a vehicle approaching a tollgate.

Referring to FIG. 2, the ETCS 1 may include a tollgate TG, which is an ETCS payment location through which the vehicle 20 passes, and a Road Side Equipment (RSE 60) that may be provided on one side of the tollgate TG.

The ETCS terminal of the vehicle 20 may perform an ETCS payment process to pay tolls through Dedicated Short-Range Communication (DSRC) with the RSE 60.

In the above, the constituent components of the ETCS 1 to which the vehicle is applied and the relationship between the constituent components have been described. Hereinafter, each of the constituent components is described in detail.

FIG. 3 is a control block diagram of a vehicle.

Referring to FIG. 3, the vehicle 20 may include a communicator 210 (e.g., including a communication interface, a wireless modem, etc.) communicating with an external electronic device, an ETCS terminal 220 including a card IC chip 223, and an apparatus equipped in the vehicle 20 (e.g., a head unit 230) controlling a Connected Car Service (CCS).

The communicator 210, the ETCS terminal 220, and the head unit 230 may each be connected to a vehicle network (NT), and may transmit and receive data with each other.

The communicator 210 may be wirelessly connected to the network 50, and may communicate with the server 10. To this end, the communicator 210 may include a wireless communication device (e.g., a known type of wireless communication module).

The ETCS terminal 220 may include a communication interface 221, an ETCS controller 222, and a card IC chip 223. Here, the communication interface 221 may be connected to the vehicle network (NT) to perform communication (e.g., communication with the communicator 210 and/or the head unit 230). The ETCS controller 222 may control issuance and deletion of cards for the card IC chip 223, may stop a card issuance operation or a card deletion operation according to a request from the head unit 230, and may change a payment card to a card usable for payment among cards stored in the card IC chip 223. The card IC chip 223 to which card information of an issued card is input may perform payment.

The communication interface 221 may be connected to the vehicle network (NT) and perform communication. To this end, the communication interface 221 may include a wireless communication device (e.g., a known type of communication module).

In response to receiving a card issuance stop request requesting to stop card issuance or a card deletion stop request requesting to stop card deletion from the head unit 230 while issuing a new card or deleting an issued card, the ETCS controller 222 may stop the ongoing card issuance operation or card deletion operation, change a payment card to a card usable for payment among the cards stored in the card IC chip 223, and control the communication interface 221 to perform ETCS payment to pay a toll or to pay for product purchase at an ETCS payment location using the card usable for payment.

In response to receiving a card issuance command including a security key and card information from the head unit 230, the ETCS controller 222 may issue a card to the card IC chip 223 using the security key. Specifically, the ETCS controller 222 may issue a card by generating an SSD and an applet corresponding to the card information to the card IC chip 223 using the security key.

After card issuance to the card IC chip 223 is completed, the ETCS controller 222 may transmit card management information corresponding to the issued card to the server 10 through the head unit 230.

The card management information may include at least one of card identification information, card lifecycle information, card company information, card issuance information, or card state information of the card.

In response to receiving a card deletion command including an authorization key from the head unit 230 through the communication interface 221, the ETCS controller 222 may delete the card issued to the card IC chip 223 using the authorization key. In this instance, deleting the card issued to the card IC chip 223 may refer to deleting the SSD and the applet corresponding to the card.

For example, in response to receiving the card deletion command including the authorization key, the ETCS controller 222 may delete the card issued to the card IC chip 223 by deleting the SSD and applet stored in the card IC chip using the authorization key.

After card deletion from the card IC chip 223 is completed, the ETCS controller 222 may transmit a message confirming the successful card deletion to the server 10 through the head unit 230.

In response to receiving a card issuance command including a security key and card information after transmitting the message confirming the successful card deletion, the ETCS controller 222 may generate an SSD and an applet corresponding to the card information on the card IC chip 223 using the security key, thereby issuing a new card to the card IC chip 223. 111

The ETCS controller 222 may include at least one memory storing a program performing the aforementioned operations and operations to be described later, and at least one processor implementing a stored program. In a case where a plurality of memories and processors are provided, the plurality of memories and processors may be integrated into one chip, or provided in physically separate locations.

The card IC chip 223 may have a plurality of issued cards. The card IC chip 223 may perform payment based on card information of a card designated as a payment card among the issued cards. For example, the card IC chip 223 may perform ETCS payment for toll payment based on toll information received from the RSE 60 provided at the tollgate TG which is an ETCS payment location.

The card IC chip 223 may include an Issuer Security Domain (ISD) which may be initially (e.g., permanently) installed in the card IC chip 223 by an initial card issuer (e.g., a manufacturer of the vehicle 20), and an SSD which is installed by a service provider (card company) providing a payment service and requires to manage a separate key. In this instance, deletion and change of the card information may be performed only by the ISD, and a structure of a Security Domain (SD) including the ISD and the SSD may comply with a Global Platform (GP) card specification.

Meanwhile, in response to receiving a card issuance stop request from the head unit 230 while issuing a new card, the ETCS controller 222 may stop the ongoing card issuance operation, and change a payment card to a card usable for payment from among the cards stored in the card IC chip 223. The ETCS controller 222 may control the communication interface 221 to terminate a communication session for the ongoing card issuance operation.

In response to receiving a card deletion stop request from the head unit 230 while deleting an issued card, the ETCS controller 222 may stop the ongoing card deletion operation, and change a payment card to a card usable for payment from among the cards stored in the card IC chip 223. The ETCS controller 222 may control the communication interface 221 to terminate a communication session for the ongoing card deletion operation.

After changing the payment card, the ETCS controller 222 may transmit card change completion information indicating completion of the payment card change to the head unit 230 through the communication interface 221.

After performing an ETCS payment process at the ETCS payment location using the changed payment card, the ETCS controller 222 may transmit payment completion information indicating completion of the ETCS payment to the head unit 230 through the communication interface 221.

In response to receiving card issuance message information, which may be message information about the stopped card issuance, from the head unit 230, the ETCS controller 222 may resume the card issuance operation according to the received card issuance message information.

In response to receiving card deletion message information, which may be message information about the stopped card deletion, from the head unit 230, the ETCS controller 222 may resume the card deletion operation according to the received card deletion message information.

The head unit 230 may control the CCS. For example, the head unit 230 may store CCS subscription information, and transmit and receive data to and from the server 10 through the communicator 210 based on the CCS subscription information.

The head unit 230 may be a vehicle infotainment system, such as an Audio, Video, Navigation, Telematics (AVNT) device.

The head unit 230 may obtain travel route information to a destination, map information, time information, and/or location information of the vehicle 20 through a navigation.

The head unit 230 and the communicator 210 may be integrated into a single device.

The head unit 230 may receive a card issuance command or a card deletion command from the server 10 through the communicator 210, and may transmit the card issuance command or the card deletion command, received from the server 10 through the communicator 210, to the ETCS terminal 220.

The head unit 230 may recognize an ETCS payment location from the map information obtained by the navigation. The ETCS payment location may be a tollgate that accepts ETCS payment, or a store that accepts ETCS payment, such as a drive-through store where customers may pay for services while in their car without parking.

The head unit 230 may obtain a remaining distance and/or a remaining time to an ETCS payment location located within a preset area from a current location of the vehicle 20 among the ETCS payment locations.

The head unit 230 may obtain a remaining distance and/or a remaining time to an ETCS payment location located on a travel route, based on the travel route information to the destination obtained by the navigation.

Based on the remaining distance (and/or remaining time) to the ETCS payment location being less than a preset distance (and/or preset time), the head unit 230 may determine whether the ETCS terminal 220 is issuing a new card or deleting an issued card.

Based on a determination that a new card is being issued or an issued card is being deleted, the head unit 230 may allow the ETCS terminal 220 to stop the card issuance operation or the card deletion operation being performed by the ETCS terminal 220.

In a case where the new card is being issued, the head unit 230 may transmit a card issuance stop request to the ETCS terminal 220, thereby stopping the ongoing card issuance operation.

In a case where the issued card is being deleted, the head unit 230 may transmit a card deletion stop request to the ETCS terminal 220, thereby stopping the ongoing card deletion operation.

After stopping the ongoing card issuance operation or the ongoing card deletion operation, the head unit 230 may allow the ETCS terminal 220 to change the payment card of the ETCS terminal 220 to a card usable for payment among the cards stored in the card IC chip 223.

The head unit 230 may receive card change completion information indicating completion of the payment card change from the ETCS terminal 220.

In response to receiving the card change completion information, the head unit 230 may notify a user that the payment card has been changed. The head unit 230 may use a screen and/or a speaker to notify the user that an existing payment card has been changed to another card.

The head unit 230 may receive payment completion information indicating completion of the ETCS payment from the ETCS terminal 220.

In response to receiving the payment completion information, the head unit 230 may request and receive card issuance message information regarding the stopped card issuance from the server 10.

In response to receiving the card issuance message information, the head unit 230 may transmit the card issuance message information to the ETCS terminal 220. The head unit 230 may allow the ETCS terminal 220 to resume the card issuance operation by transmitting the card issuance message information, which is message information about the stopped card issuance, to the ETCS terminal 220.

In response to receiving the payment completion information, the head unit 230 may request and receive card deletion message information regarding the stopped card deletion from the server 10.

In response to receiving the card deletion message information, the head unit 230 may transmit the card deletion message information to the ETCS terminal 220. The head unit 230 may allow the ETCS terminal 220 to resume the card deletion operation by transmitting the card deletion message information to the ETCS terminal 220.

The head unit 230 may include at least one memory storing a program performing the aforementioned operations and operations to be described later, and at least one processor implementing a stored program. In a case where a plurality of memories and processors are provided, the plurality of memories and processors may be integrated into one chip, or provided in physically separate locations.

The vehicle 20 may include the above-described constituent components, and thus even during new card issuance or deletion of an issued card while the vehicle 20 is approaching a tollgate, toll payment may be performed by stopping the card issuance or card deletion and activating a card usable for payment. In other words, even when the vehicle approaches a tollgate while a new card is being issued or an issued card is being deleted, a toll may be paid when entering the tollgate.

Figure 4:
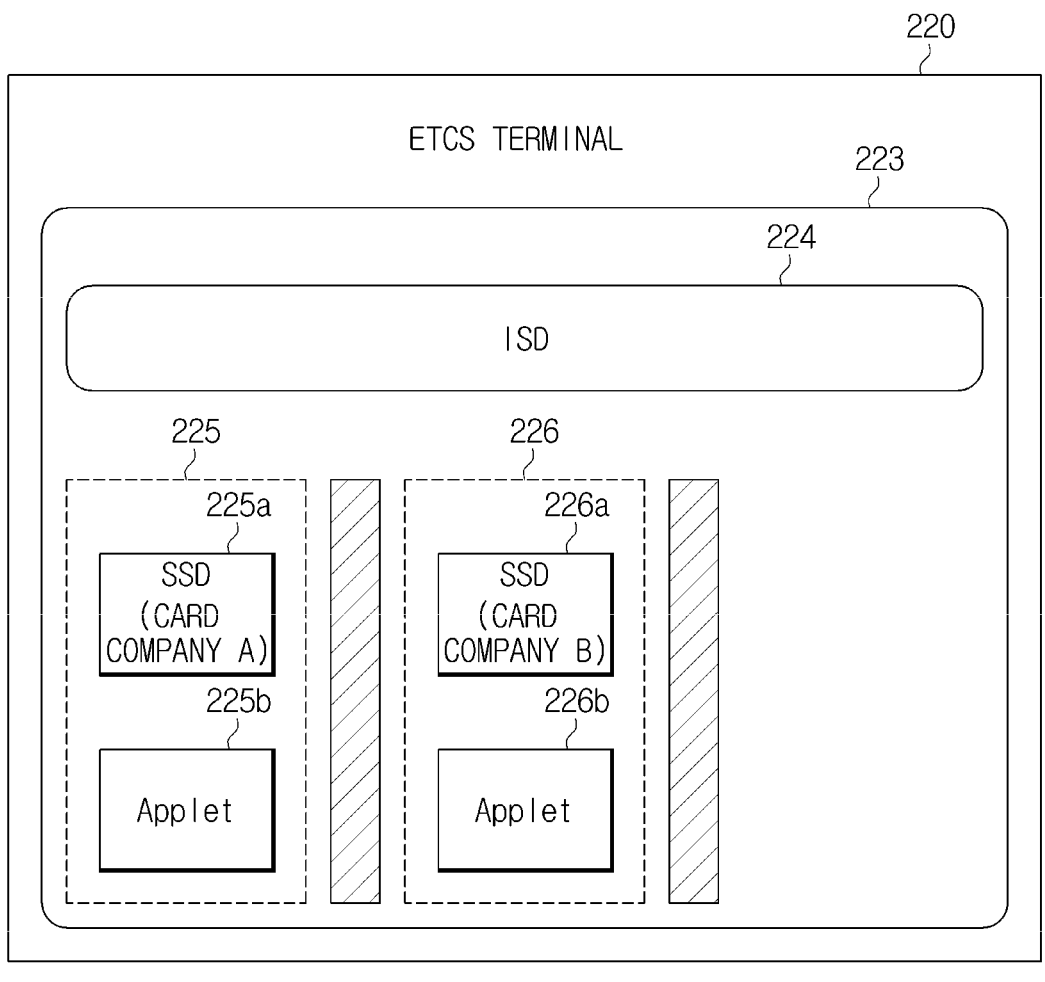
FIG. 4 is a diagram illustrating a card issued to a card Integrated Circuit (IC) chip of an ETCS terminal in a vehicle.

FIG. 4 is a diagram illustrating a card issued to a card IC chip of an ETCS terminal in a vehicle.

Referring to FIG. 4, a card issued to the card IC chip 223 is not a physical card, and card information is stored in the card IC chip 223. As such, the ETCS terminal 220 uses an embedded ETCS card (e.g., embedded HI-PASS card) and has a structure where a user cannot physically remove the card (e.g., without breaking the device or any part of the device).

The card IC chip 223 may have a plurality of issued cards 225 and 226.

The card IC chip 223 may include an ISD 224, an SSD 225a and an applet 225b of a card company A, and an SSD 226a and an applet 226b of a card company B. In this instance, deletion and change of card information may be performed only by the ISD 224, and a structure of Security Domain (SD) including the ISD 224, the SSDs 225a and 226a, and the applets 225b and 226b may comply with the Global Platform (GP) card specification.

The ETCS terminal 220 may issue the cards 225 and 226 by generating the SSDs 225a and 226a and the applets 225b and 226b corresponding to card information in the card IC chip 223 using a security key. In this instance, generation of the SSDs 225a and 226a and applets 225b and 226b may be performed by the ISD 224.

In this instance, the security key may correspond to a key having an authority to issue a new card, and may be issued by Personal Secure Application Module (PerSAM). The PerSAM may be a card-type security device that may be required to be used according to a specified procedure in order to securely deliver a key for issuing a card (electronic currency). The PerSAM may be a module having key information required for issuance, and may be provided by a toll road authority that oversees ETCS.

The card IC chip 223 may perform a payment process based on card information of a card designated as a payment card among issued cards. For example, the card IC chip 223 may perform ETCS payment based on toll information received from a base station provided at an ETCS payment location.

Figure 5:
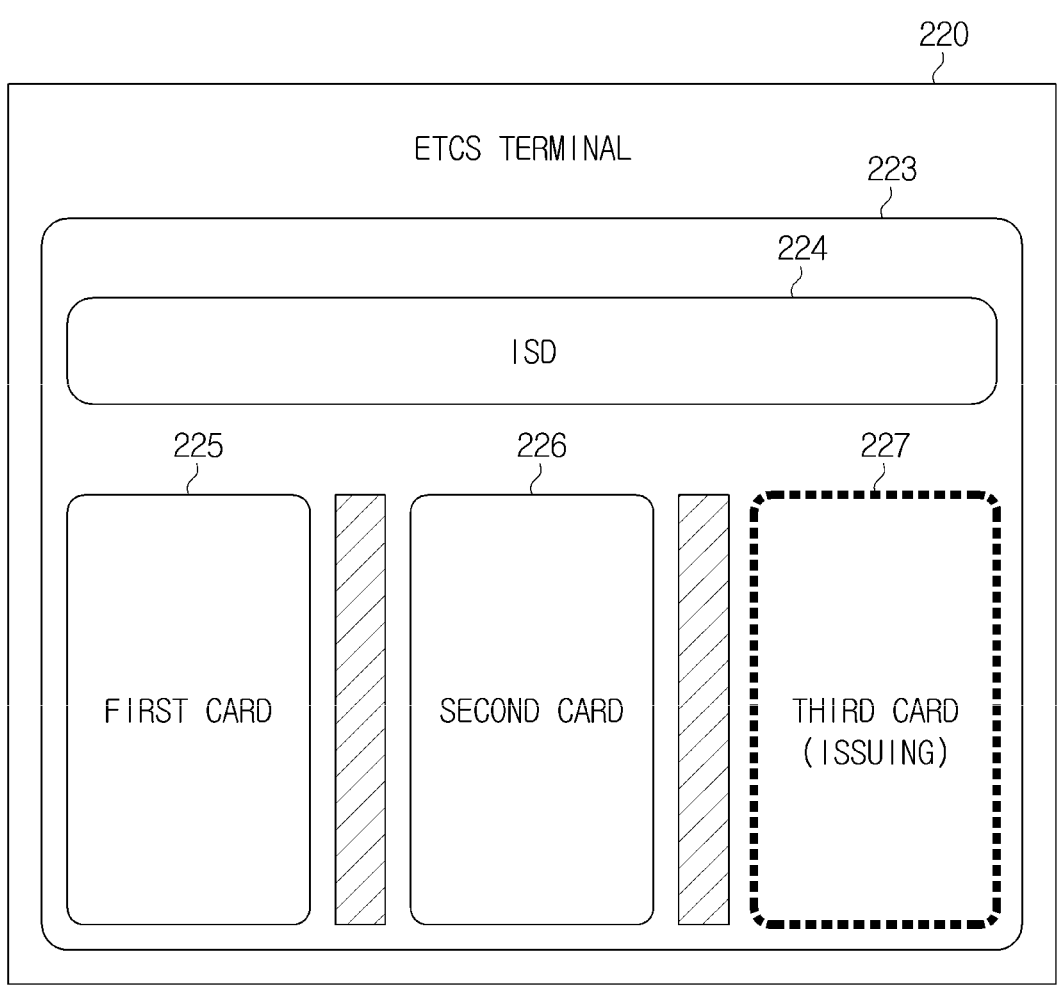
FIG. 5 is a diagram illustrating a new card issuance to a card IC chip of an ETCS terminal in a vehicle.

FIG. 5 is a diagram illustrating a new card issuance to a card IC chip of an ETCS terminal in a vehicle.

Referring to FIG. 5, in response to receiving a card issuance command from the head unit 230, the ETCS terminal 220 may generate a new SSD and applet in the card IC chip 223 to issue a new card 227.

More specifically, the ETCS terminal 220 may issue the new card 227 by generating the SSD and the applet corresponding to new card information in the card IC chip 223 using a security key.

Thereafter, the ETCS terminal 220 may transmit card management information to the head unit 230. The head unit 230 may transmit the card management information to the server 10. That is, after issuance of the new card to the card IC chip 223 is completed, the ETCS terminal 220 may transmit the card management information of the newly issued card to the server 10 through the head unit 230.

In this instance, the card management information may include at least one of card identification information for identifying the card, card expiration information indicating an expiration date of the card (e.g., blank card, completed issuance, etc.), card company information, card issuance information, or card state information.

In response to receiving the card management information from the vehicle 20, the server 10 may manage a card state based on the card management information. For example, the server 10 may match and store customer information with the card management information of the card issued to the vehicle, thereby managing the customer information and the card management information of the card issued to the vehicle 20.

Figure 6:
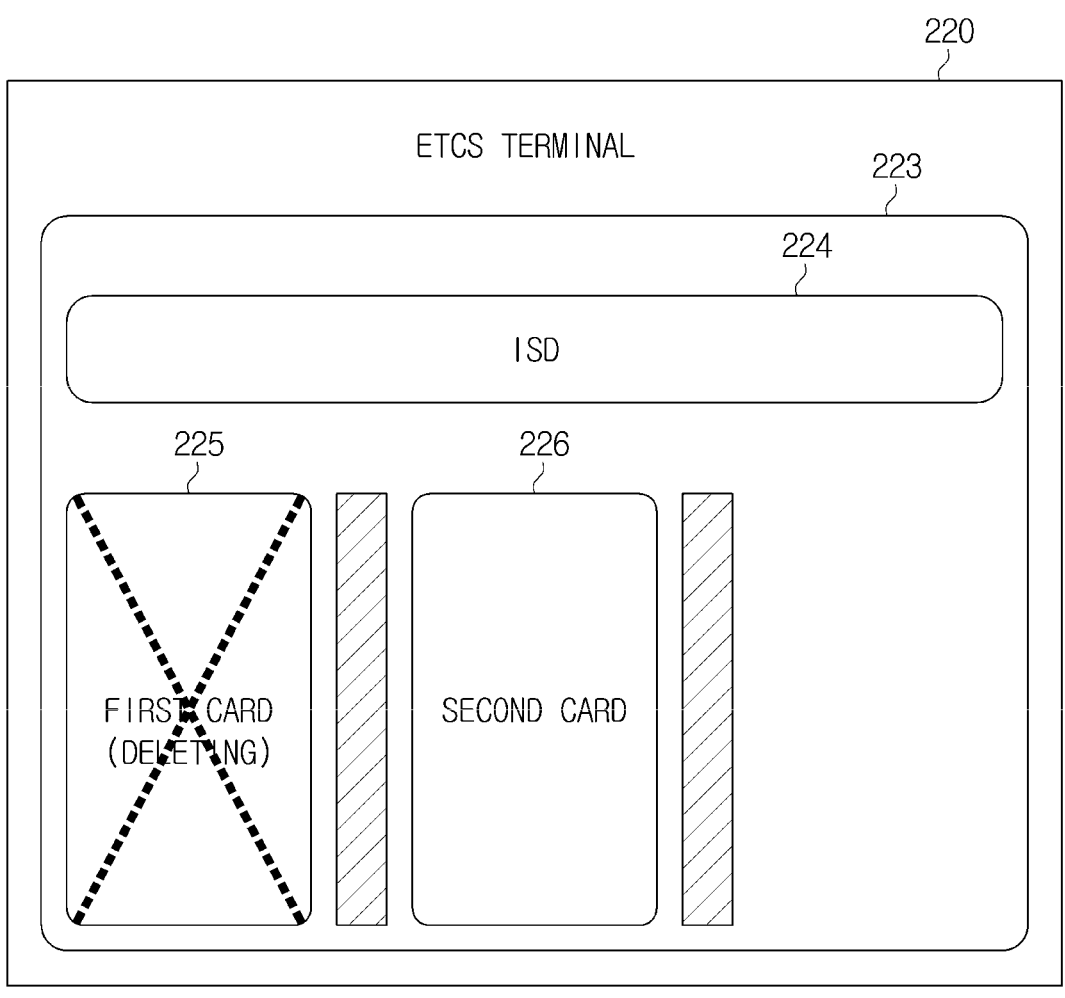
FIG. 6 is a diagram illustrating deletion of a card issued to a card IC chip of an ETCS terminal in a vehicle.

FIG. 6 is a diagram illustrating deletion of a card issued to a card IC chip of an ETCS terminal in a vehicle.

Referring to FIG. 6, the ETCS terminal 220 may delete a card issued to the card IC chip 223, in response to receiving a card deletion command from the head unit 230.

More specifically, the ETCS terminal 220 may delete an SSD and an applet of the card 225 corresponding to the card deletion command from among the cards 225 and 226 issued to the card IC chip 223 by using an authorization key, thereby deleting the issued card 225.

Thereafter, the ETCS terminal 220 may transmit, to the head unit 230, whether the card issued to the card IC chip 223 has been successfully deleted. The head unit 230 may transmit, to the server 10, whether the card has been successfully deleted.

For example, after card deletion from the card IC chip 223 is completed, the ETCS terminal 220 may transmit a message confirming the successful card deletion to the server 10 through the head unit 230.

Figure 7:
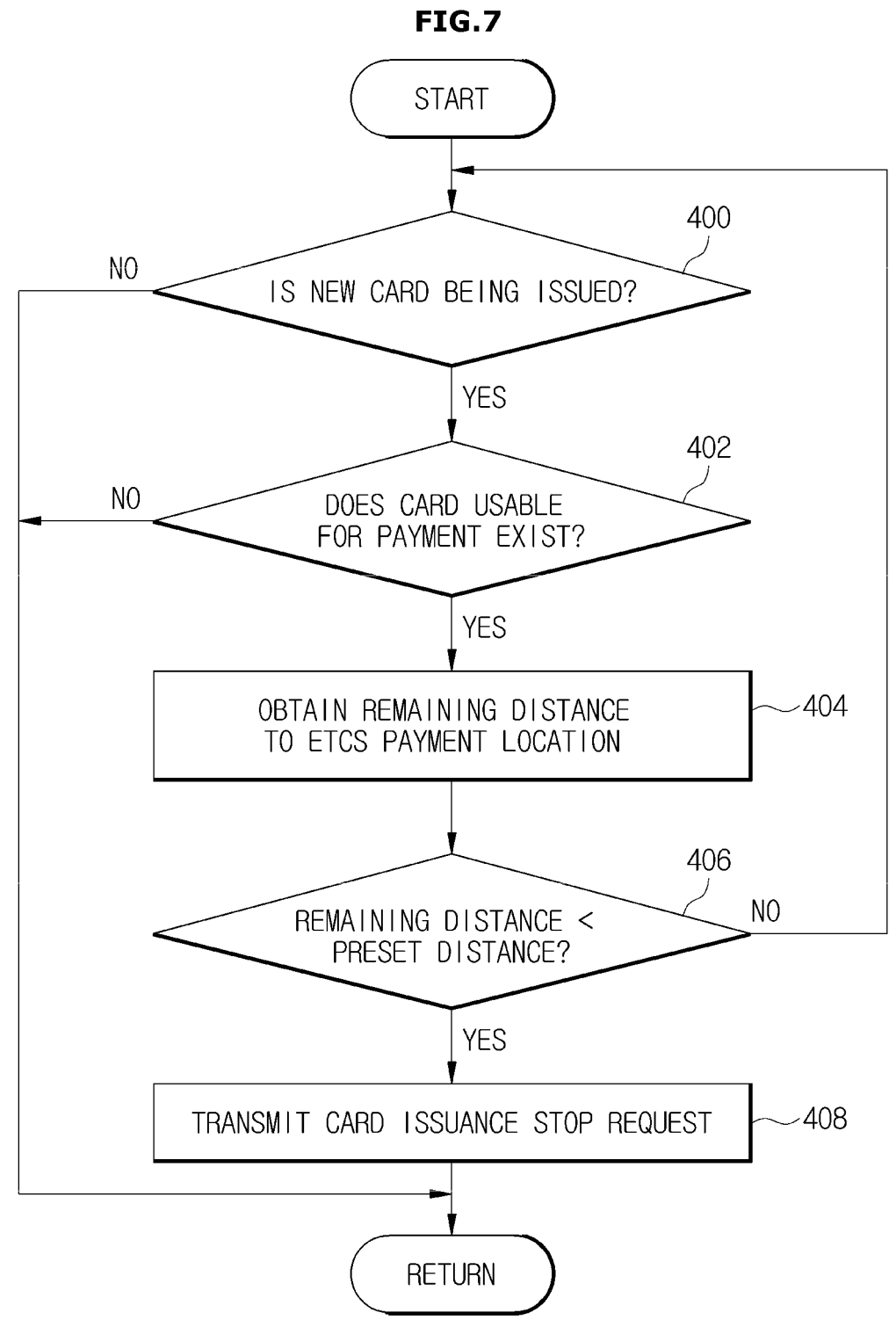
FIG. 7 and FIG. 8 are flowcharts illustrating operations performed when a vehicle approaches an ETCS payment location during a new card issuance in an ETCS terminal in the vehicle.
Figure 8:
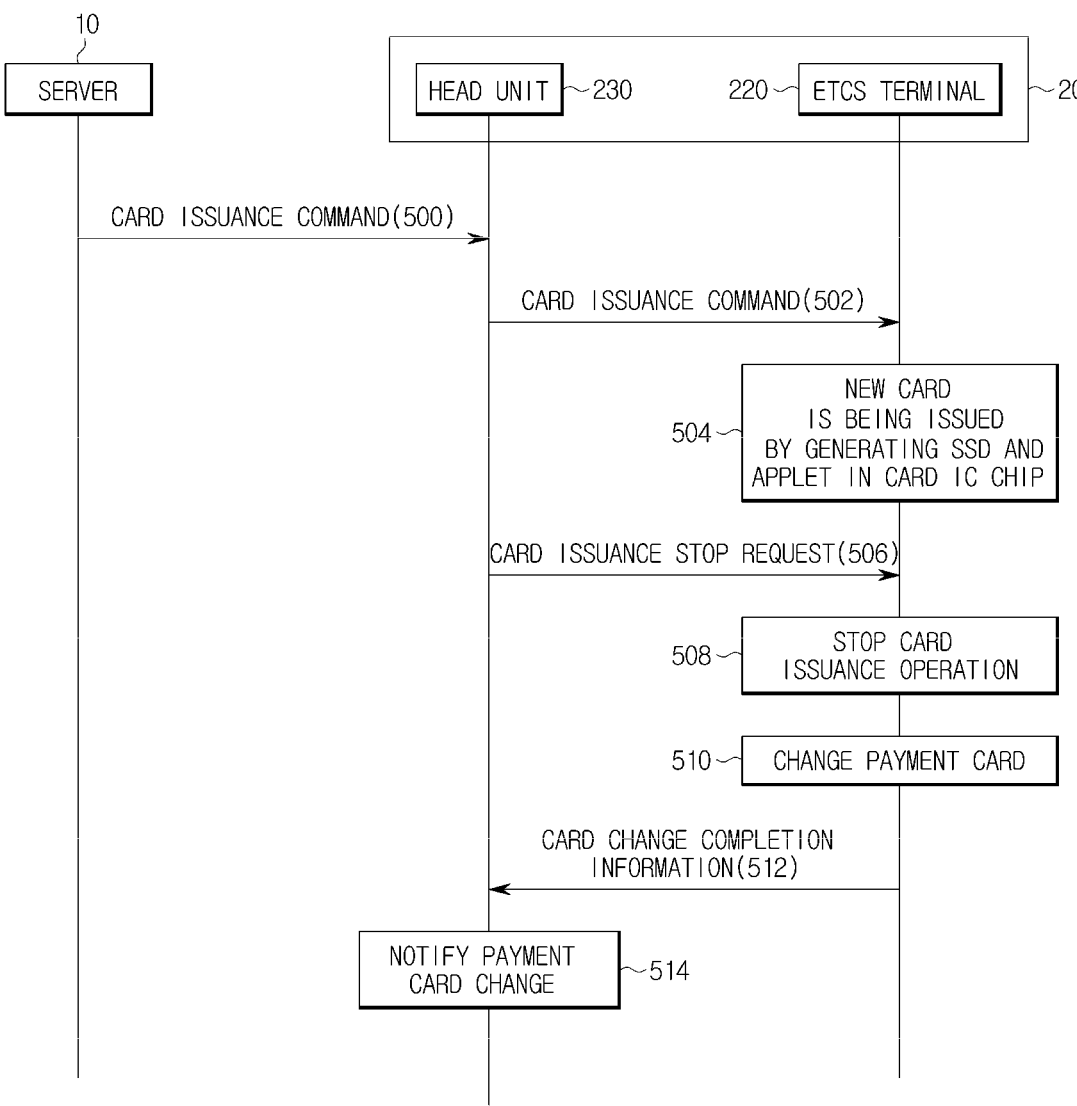

FIG. 7 and FIG. 8 are flowcharts illustrating operations performed when a vehicle approaches an ETCS payment location during a new card issuance in an ETCS terminal in the vehicle.

Referring to FIG. 7, the head unit 230 may determine whether the ETCS terminal 220 is issuing a new card (400).

Based on a determination that a new card is being issued (Yes in operation 400), the head unit 230 may determine whether a card usable for payment exists in the card IC chip 223 of the ETCS terminal 220 (402). The head unit 230 may determine whether an ETCS card usable for payment is present other than an embedded ETCS card currently being issued.

Based on a determination that a card usable for payment exists in the card IC chip 223 (Yes in operation 402), the head unit 230 may obtain a remaining distance to an ETCS payment location (404).

The head unit 230 may recognize the ETCS payment location from map information obtained by a navigation. The ETCS payment location may be a tollgate that accepts ETCS payment, or a store that accepts ETCS payment, such as a drive-through store where customers may pay for services while in their car without parking.

The head unit 230 may obtain a remaining distance and/or a remaining time to an ETCS payment location located within a preset area from a current location of the vehicle 20 among the ETCS payment locations. The head unit 230 may receive Global Positioning System (GPS) information of the vehicle 20, determine a speed and location of the vehicle based on the GPS information, and obtain the remaining distance to a nearest tollgate from the current location of the vehicle after map matching.

The head unit 230 may obtain a remaining distance and/or a remaining time to an ETCS payment location located on a travel route, based on travel route information to a destination obtained by the navigation. In a case where a route to the destination is set, the head unit 230 may determine a distance, time required, and the like, to a tollgate that accepts ETCS payment.

The head unit 230 may determine whether the remaining distance (and/or remaining time) to the ETCS payment location is less than a preset distance (and/or preset time) (406).

Based on a determination that the remaining distance (and/or remaining time) to the ETCS payment location being less than the preset distance (and/or preset time) (Yes in operation 406), the head unit 230 may transmit, to the ETCS terminal 220, a card issuance stop request to stop a card issuance operation of the ETCS terminal 220 (408). The head unit 230 may use a screen or speaker to notify a user that ETCS payment may not be made with an issued card (e.g., the HI-PASS card which is being issued).

As described above, when the ETCS terminal 220 is issuing a new card, a card usable for payment exists in the card IC chip 223, and a remaining distance (and/or remaining time) to an ETCS payment location is less than the preset distance (and/or preset time), the head unit 230 may transmit the card issuance stop request to the ETCS terminal 220, thereby allowing the ETCS terminal 220 to stop the ongoing card issuance operation and change a payment card to another card usable for payment.

Referring to FIG. 8, the server 10 may transmit a card issuance command to the head unit 230 (500).

In response to receiving the card issuance command from the server 10, the head unit 230 may transmit the received card issuance command to the ETCS terminal 220 (502).

In response to receiving the card issuance command from the head unit 230, the ETCS terminal 220 may issue a new card by generating a new SSD and applet in the card IC chip 223 according to the card issuance command (504).

The ETCS terminal 220 may receive the card issuance stop request from the head unit 230 (506), while issuing the new card.

In response to receiving the card issuance stop request from the head unit 230, the ETCS terminal 220 may stop the ongoing card issuance operation (508).

The ETCS terminal 220 may change a payment card to a card usable for payment among the cards stored in the card IC chip 223 (510).

After changing the payment card, the ETCS terminal 220 may transmit card change completion information indicating completion of the payment card change to the head unit 230 (512).

In response to receiving the card change completion information indicating completion of the payment card change from the ETCS terminal 220, the head unit 230 may notify a user that an existing payment card has been changed to another card using a screen or speaker (514).

Figure 9:
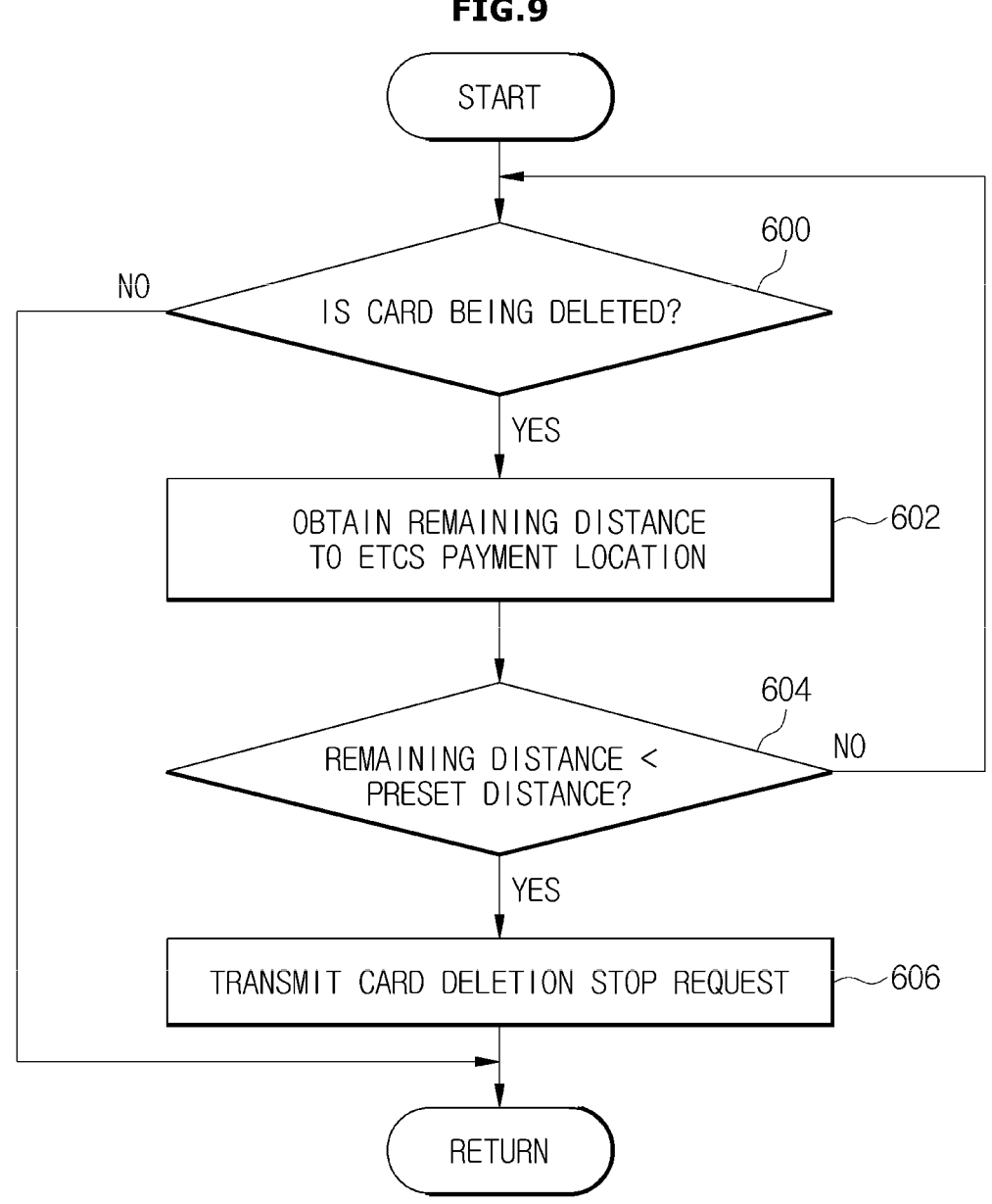
FIG. 9 and FIG. 10 are flowcharts illustrating operations performed when a vehicle approaches an ETCS payment location during deletion of a card issued to an ETCS terminal in the vehicle.
Figure 10:
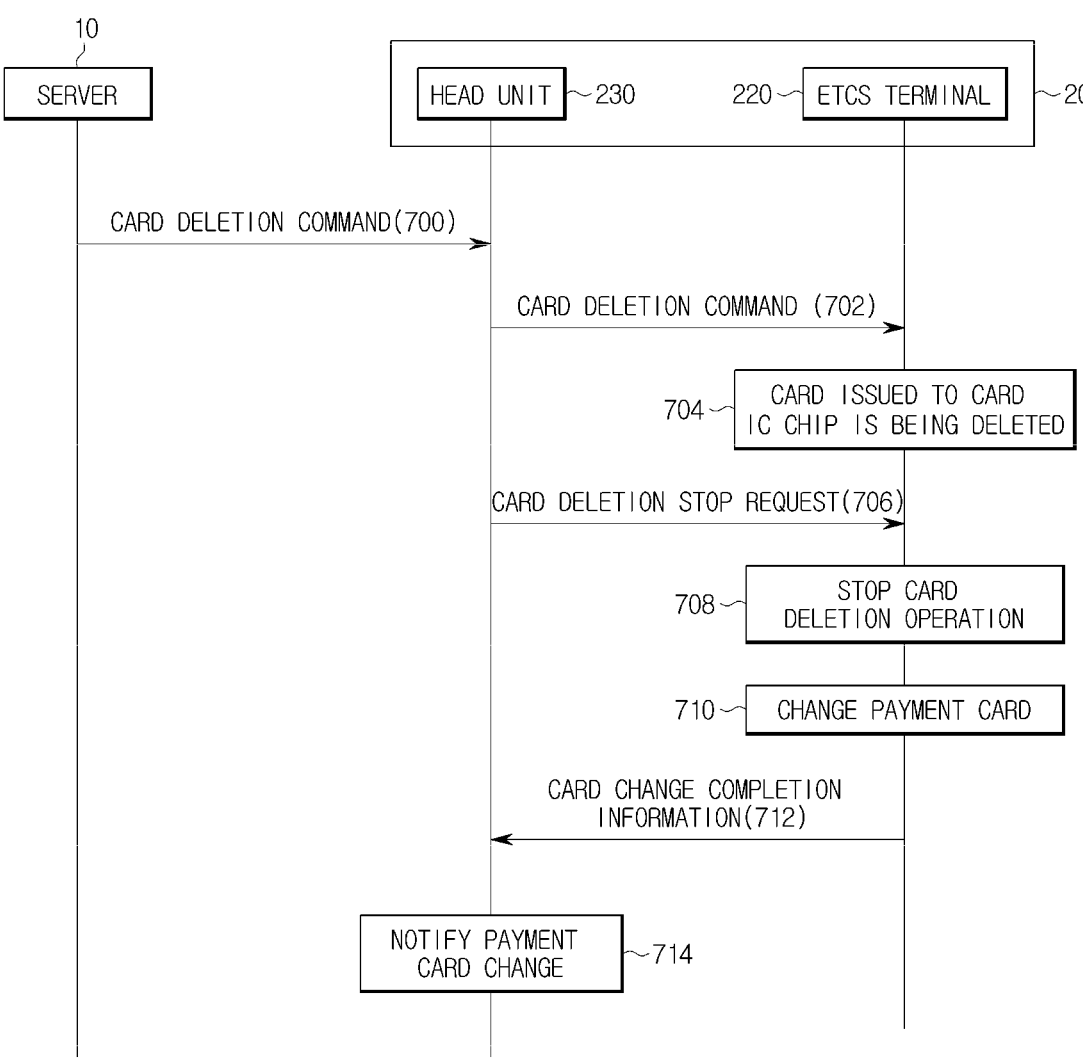

FIG. 9 and FIG. 10 are flowcharts illustrating operations performed when a vehicle approaches an ETCS payment location during deletion of a card issued in an ETCS terminal in the vehicle.

Referring to FIG. 9, the head unit 230 may determine whether the ETCS terminal 220 is deleting an issued card (600).

Based on a determination that the issued card is being deleted (Yes in operation 600), the head unit 230 may obtain a remaining distance to an ETCS payment location (602).

The head unit 230 may determine whether the remaining distance (and/or remaining time) to the ETCS payment location is less than a preset distance (and/or preset time) (604).

Based on a determination that the remaining distance (and/or remaining time) to the ETCS payment location is less than the preset distance (and/or preset time) (Yes in operation 604), the head unit 230 may transmit, to the ETCS terminal 220, a card deletion stop request to stop the card deletion operation of the ETCS terminal 220 (606). The card deletion operation may be performed, when the issued card is not likely to be used after a toll has been paid at the ETCS payment location using the issued card.

As described above, when the ETCS terminal 220 is deleting an issued card, a card usable for payment exists in the card IC chip 223, and a remaining distance (and/or remaining time) to the ETCS payment location is less than the preset distance (and/or preset time), the head unit 230 may transmit the card deletion stop request to the ETCS terminal 220, thereby allowing the ETCS terminal 220 to stop the ongoing card deletion operation and change a payment card to another card usable for payment.

Referring to FIG. 10, the server 10 may transmit a card deletion command to the head unit 230 (700).

In response to receiving the card deletion command from the server 10, the head unit 230 may transmit the received card deletion command to the ETCS terminal 220 (702).

In response to receiving the card deletion command from the head unit 230, the ETCS terminal 220 may delete an issued card by deleting an SSD and applet of a card corresponding to the card deletion command from the cards issued to the card IC chip 223 according to the card deletion command (704).

The ETCS terminal 220 may receive the card deletion stop request from the head unit 230 (706), while deleting the issued card.

In response to receiving the card deletion stop request from the head unit 230, the ETCS terminal 220 may stop the ongoing card deletion operation (708).

The ETCS terminal 220 may change a payment card to a card usable for payment among the cards stored in the card IC chip 223 (710).

After changing the payment card, the ETCS terminal 220 may transmit card change completion information indicating completion of the payment card change to the head unit 230 (712).

In response to receiving the card change completion information indicating completion of the payment card change from the ETCS terminal 220, the head unit 230 may notify a user that an existing payment card has been changed to another card using a screen or speaker (714).

Figure 11:
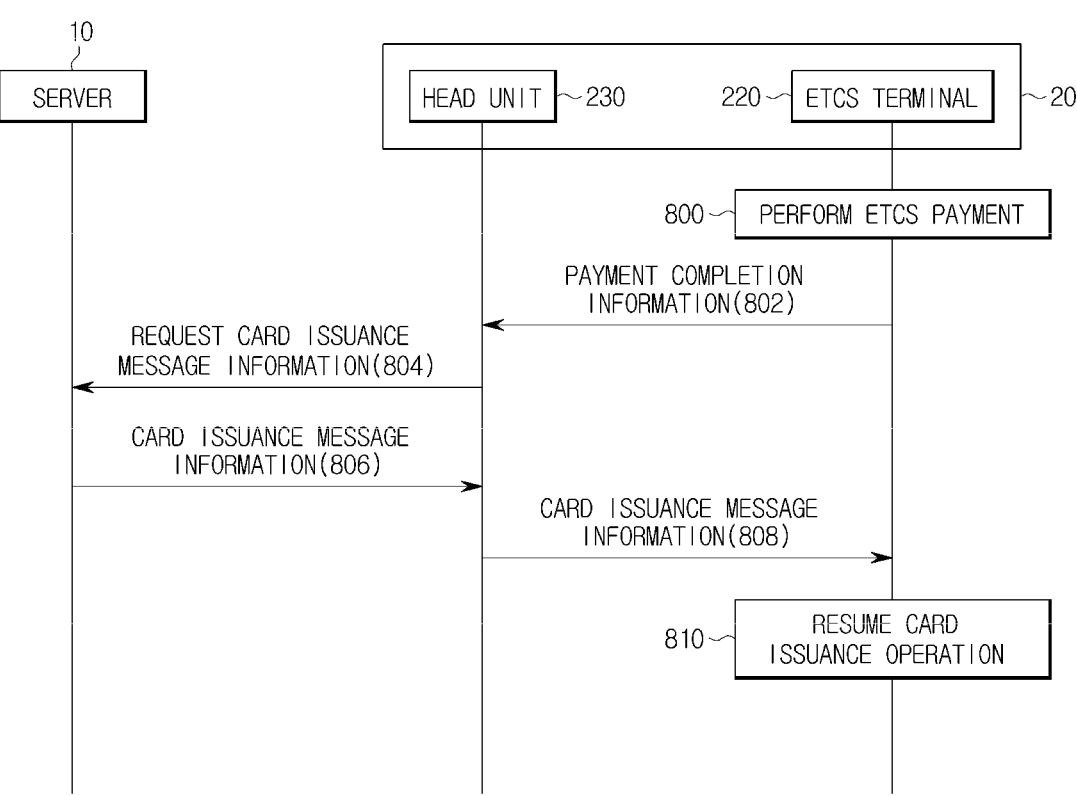
FIG. 11 is a flowchart illustrating operations performed to resume card issuance after completion of ETCS payment in a vehicle.

FIG. 11 is a flowchart illustrating operations performed to resume card issuance after completion of ETCS payment in a vehicle.

Referring to FIG. 11, the ETCS terminal 220 may perform an ETCS payment process at an ETCS payment location using a changed payment card (800).

After performing the ETCS payment process, the ETCS terminal 220 may transmit payment completion information indicating completion of the ETCS payment process to the head unit 230 (802).

In response to receiving the payment completion information from the ETCS terminal 220, the head unit 230 may request card issuance message information regarding a stopped card issuance from the server 10 (804).

The server 10 may transmit the card issuance message information to the head unit 230 in response to the request from the head unit 230 (806).

In response to receiving the card issuance message information from the server 10, the head unit 230 may transmit the card issuance message information to the ETCS terminal 220 (808).

The head unit 230 may allow the ETCS terminal 220 to resume the card issuance operation by transmitting the card issuance message information to the ETCS terminal 220 (810).

Figure 12:
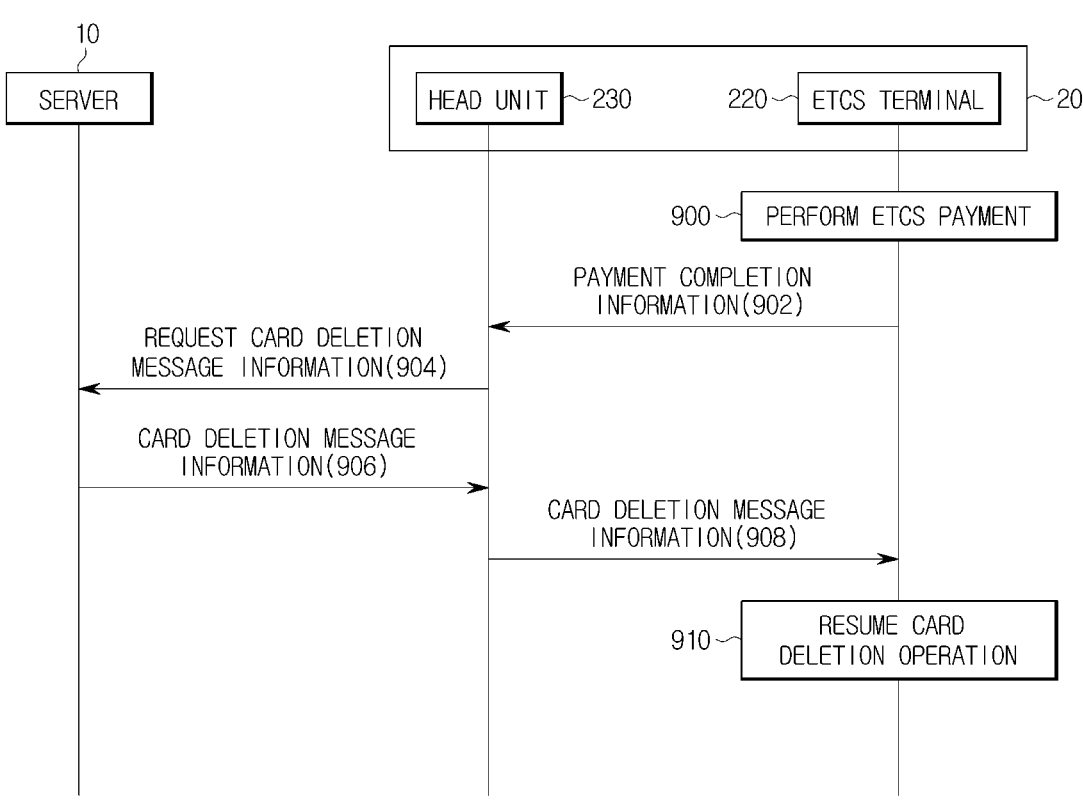
FIG. 12 is a flowchart illustrating operations performed to resume card deletion after completion of ETCS payment in a vehicle.

FIG. 12 is a flowchart illustrating operations performed to resume card deletion after completion of ETCS payment in a vehicle.

Referring to FIG. 12, the ETCS terminal 220 may perform an ETCS payment process at an ETCS payment location using a changed payment card (900).

After performing the ETCS payment, the ETCS terminal 220 may transmit payment completion information indicating completion of the ETCS payment to the head unit 230 (902).

In response to receiving the payment completion information from the ETCS terminal 220, the head unit 230 may request card deletion message information regarding stopped card deletion from the server 10 (904).

The server 10 may transmit the card deletion message information to the head unit 230 in response to the request from the head unit 230 (906).

In response to receiving the card deletion message information from the server 10, the head unit 230 may transmit the card deletion message information to the ETCS terminal 220 (908).

The head unit 230 may allow the ETCS terminal 220 to resume the card deletion operation by transmitting the card deletion message information to the ETCS terminal 220 (910).

According to an aspect of the disclosure, a vehicle may include: an Electronic Toll Collection System (ETCS) terminal including a card Integrated Circuit (IC) chip; and a head unit connected to the ETCS terminal via a vehicle network, wherein the head unit may be configured to: obtain a remaining distance to an ETCS payment location, based on the remaining distance being less than a preset distance, determine whether the ETCS terminal is issuing a new card or deleting an issued card, based on a determination that the ETCS terminal is issuing the new card or deleting the issued card, allow the ETCS terminal to stop an ongoing card issuance operation or an ongoing card deletion operation, and allow the ETCS terminal to change a payment card of the ETCS terminal to a card usable for payment from among cards stored in the card IC chip.

The head unit may be configured to obtain a remaining distance to an ETCS payment location located within a preset area from a current location of the vehicle based on map information obtained by a navigation, or obtain a remaining distance to an ETCS payment location located on a travel route based on travel route information to a destination obtained by the navigation.

The ETCS payment location may include at least one of a location of a tollgate or a location of a store accepting ETCS payment.

Based on a determination that the ETCS terminal is issuing the new card, the head unit may be configured to transmit, to the ETCS terminal, a card issuance stop request to stop issuing the new card, and the ETCS terminal may be configured to stop the ongoing card issuance operation in response to receiving the card issuance stop request from the head unit, and change the payment card to the card usable for payment from among the cards stored in the card IC chip.

Based on a determination that the ETCS terminal is deleting the issued card, the head unit may be configured to transmit, to the ETCS terminal, a card deletion stop request to stop deleting the issued card, and the ETCS terminal may be configured to stop the ongoing card deletion operation in response to receiving the card deletion stop request from the head unit, and change the payment card to the card usable for payment from among the cards stored in the card IC chip.

The ETCS terminal may include: a communication interface communicatively connected to the vehicle network; a card Integrated Circuit (IC) chip configured to store the issued card; and an ETCS controller configured to control the communication interface and the card IC chip, wherein the ETCS controller may be configured to: in response to receiving, by the ETCS terminal, a card issuance stop request to stop issuing the new card or a card deletion stop request to stop deleting the issued card from the head unit while the ETCS terminal is issuing the new card or deleting the issued card, stop the ongoing card issuance operation or the ongoing card deletion operation, change the payment card to the card usable for payment from among the cards stored in the card IC chip, and control the communication interface to perform ETCS payment at the ETCS payment location using the card usable for payment.

The ETCS controller may be configured to control the communication interface to terminate a communication session for the ongoing card issuance operation or the ongoing card deletion operation, in response to receiving the card issuance stop request or the card deletion stop request.

The head unit may be configured to request and receive first message information about the stopped card issuance or second message information about the stopped card deletion from a server, in response to receiving payment completion information indicating completion of ETCS payment from the ETCS terminal, and transmit the first message information or the second message information to the ETCS terminal.

The ETCS terminal may be configured to resume the stopped card issuance operation according to the first message information, or resume the stopped card deletion operation according to the second message information.

The head unit may be configured to notify a user of a payment card change, in response to receiving card change completion information indicating completion of the payment card change from the ETCS terminal.

According to an aspect of the disclosure, a control method of a vehicle may include: obtaining a remaining distance to an ETCS payment location, based on the remaining distance being less than a preset distance, determining whether an Electronic Toll Collection System (ETCS) terminal including a card Integrated Circuit (IC) chip is issuing a new card or deleting an issued card, based on a determination that the ETCS terminal is issuing the new card or deleting the issued card, stopping an ongoing card issuance operation or an ongoing card deletion operation of the ETCS terminal, and changing a payment card of the ETCS terminal to a card usable for payment from among cards stored in the card IC chip.

The obtaining of the remaining distance may include, by a head unit connected to the ETCS terminal via a vehicle network, obtaining a remaining distance to an ETCS payment location located within a preset area from a current location of the vehicle based on map information obtained by a navigation, or obtaining a remaining distance to an ETCS payment location located on a travel route based on travel route information to a destination obtained by the navigation.

The ETCS payment location may include at least one of a location of a tollgate or a location of a store accepting ETCS payment.

The stopping of the ongoing card issuance operation may include: transmitting, by a head unit connected to the ETCS terminal via a vehicle network, a card issuance stop request to stop issuing the new card to the ETCS terminal, stopping, by the ETCS terminal, the ongoing card issuance operation, in response to receiving the card issuance stop request from the head unit, and changing, by the ETCS terminal, the payment card to the card usable for payment from among cards stored in the card IC chip.

The stopping of the ongoing card deletion operation may include: transmitting, by a head unit connected to the ETCS terminal via a vehicle network, a card deletion stop request to stop deleting the issued card, stopping, by the ETCS terminal, the ongoing card deletion operation, in response to receiving the card deletion stop request from the head unit, and changing, by the ETCS terminal, the payment card to the card usable for payment from among the cards stored in the card IC chip.

The stopping of the ongoing card issuance operation or the ongoing card deletion operation may include: controlling, by the ETCS terminal, a communication interface connected to the vehicle network to terminate a communication session for the ongoing card issuance operation or the ongoing card deletion operation, in response to receiving, by the ETCS terminal, a card issuance stop request to stop issuing the new card or a card deletion stop request to stop deleting the issued card.

The control method may further include: changing, by the ETCS terminal, the payment card of the ETCS terminal to the card usable for payment from among the cards stored in the card IC chip, and then performing ETCS payment at an ETCS payment location using the card usable for payment.

The control method may further include: in response to receiving payment completion information indicating completion of ETCS payment from the ETCS terminal, requesting and receiving, by a head unit connected to the ETCS terminal via a vehicle network, first message information about the stopped card issuance or second message information about the stopped card deletion from a server, and transmitting the first message information or the second message information to the ETCS terminal.

The control method may further include: resuming the stopped card issuance operation according to the first message information, or resuming the stopped card deletion operation according to the second message information.

The control method may further include: in response to receiving card change completion information indicating completion of a payment card change from the ETCS terminal, notifying, by a head unit connected to the ETCS terminal via a vehicle network, a user of the payment card change.

As is apparent from the above, according to the disclosure, an ETCS payment process can be made while issuing a new card or deleting an issued card, thereby improving customer convenience and satisfaction. In addition, when a vehicle according to the disclosure approaches a tollgate while a new card is being issued or an issued card is being deleted, a toll can be paid by activating another card usable for payment.

Meanwhile, the aforementioned controller and/or its constituent components may include at least one processor/microprocessor(s) combined with a computer-readable recording medium storing a computer-readable code/algorithm/software. The processor/microprocessor(s) may execute the computer-readable code/algorithm/software stored in the computer-readable recording medium to perform the above-descried functions, operations, steps, and the like.

The aforementioned controller and/or its constituent components may further include a memory implemented as a non-transitory computer-readable recording medium or transitory computer-readable recording medium. The memory may be controlled by the aforementioned controller and/or its constituent components and configured to store data, transmitted to or received from the aforementioned controller and/or its constituent components, or data processed or to be processed by the aforementioned controller and/or its constituent components.

The disclosed features may be implemented as the computer-readable code/algorithm/software in the computer-readable recording medium. The computer-readable recording medium may be a non-transitory computer-readable recording medium such as a data storage device capable of storing data readable by the processor/microprocessor(s). For example, the computer-readable recording medium may be a hard disk drive (HDD), a solid state drive (SSD), a silicon disk drive (SDD), a read only memory (ROM), a compact disc read only memory (CD-ROM), a magnetic tape, a floppy disk, an optical recording medium, and the like.

What is claimed is:

1. A vehicle, comprising:
an Electronic Toll Collection System (ETCS) terminal including a card Integrated Circuit (IC) chip; and
an apparatus connected to the ETCS terminal via a vehicle network of the vehicle,
wherein the apparatus is configured to:
obtain a remaining distance to an ETCS payment location,
based on the remaining distance being less than a preset distance, determine whether the ETCS terminal is issuing a new card via Over The Air (OTA) or deleting an issued card via OTA,
based on a determination that the ETCS terminal is issuing the new card via OTA or deleting the issued card via OTA, control the ETCS terminal to automatically stop an ongoing card issuance operation via OTA or an ongoing card deletion operation via OTA, and
after automatically stopping the ongoing card issuance operation via OTA or the ongoing card deletion operation via OTA, control the ETCS terminal to change a payment card of the ETCS terminal to a card usable for payment from among cards stored in the card IC chip.

2. The vehicle of claim 1, wherein the apparatus is configured to obtain the remaining distance by:
obtaining a remaining distance to an ETCS payment location located within a preset area from a location of the vehicle based on map information of a navigation device, or
obtaining a remaining distance to an ETCS payment location located on a travel route based on travel route information to a destination obtained by the navigation device.

3. The vehicle of claim 2, wherein the ETCS payment location comprises at least one of a location of a tollgate or a location accepting ETCS payment.

4. The vehicle of claim 1, wherein:
based on a determination that the ETCS terminal is issuing the new card, the apparatus is configured to transmit, to the ETCS terminal, a card issuance stop request to stop issuing the new card, and the ETCS terminal is configured to stop the ongoing card issuance operation, in response to receiving the card issuance stop request, and the ETCS terminal is configured to change the payment card to the card usable for payment from among the cards stored in the card IC chip.

5. The vehicle of claim 1, wherein:

based on a determination that the ETCS terminal is deleting the issued card, the apparatus is configured to transmit, to the ETCS terminal, a card deletion stop request to stop deleting the issued card, and the ETCS terminal is configured to stop the ongoing card deletion operation, in response to receiving the card deletion stop request, and the ETCS terminal is configured to change the payment card to the card usable for payment from among the cards stored in the card IC chip.

6. The vehicle of claim 1, wherein the ETCS terminal comprises:

a communication interface communicatively connected to the vehicle network;

a card Integrated Circuit (IC) chip configured to store the issued card; and an ETCS controller configured to control the communication interface and the card IC chip, wherein the ETCS controller is configured to:

in response to receiving, by the ETCS terminal, a card issuance stop request to stop issuing the new card or a card deletion stop request to stop deleting the issued card while the ETCS terminal is in a process of issuing the new card or deleting the issued card, stop the ongoing card issuance operation or the ongoing card deletion operation, change the payment card to the card usable for payment from among the cards stored in the card IC chip, and control the communication interface to perform an ETCS payment process at the ETCS payment location using the card usable for payment.

7. The vehicle of claim 6, wherein the ETCS controller is configured to control, based on receiving the card issuance stop request or the card deletion stop request, the communication interface to terminate a communication session for the ongoing card issuance operation or the ongoing card deletion operation.

8. The vehicle of claim 1, wherein the apparatus is configured to:

based on receiving payment completion information indicating completion of an ETCS payment process, receive, from a server, first message information about the stopped card issuance operation or second message information about the stopped card deletion operation, and transmit the first message information or the second message information to the ETCS terminal.

9. The vehicle of claim 8, wherein the ETCS terminal is configured to resume the stopped card issuance operation according to the first message information, or resume the stopped card deletion operation according to the second message information.

10. The vehicle of claim 1, wherein the apparatus is configured to transmit a notification signal indicating a payment card change, in response to receiving card change completion information indicating completion of the payment card change from the ETCS terminal.

11. A control method of a vehicle, the control method comprising:

determining, by the vehicle, a remaining distance to an ETCS payment location;

based on the remaining distance being less than a preset distance, determining, by an apparatus of the vehicle connected to an Electronic Toll Collection System (ETCS) terminal via a vehicle network of the vehicle, whether the ETCS terminal including a card Integrated Circuit (IC) chip is issuing a new card via Over The Air (OTA) or deleting an issued card via OTA;

based on a determination that the ETCS terminal is issuing the new card via OTA or deleting the issued card via OTA, automatically stopping, by the apparatus, an ongoing card issuance operation via OTA or an ongoing card deletion operation via OTA of the ETCS terminal; and after automatically stopping the ongoing card issuance operation via OTA or the ongoing card deletion operation via OTA, changing a payment card of the ETCS terminal to a card usable for payment from among cards stored in the card IC chip.

12. The control method of claim 11, wherein the determining of the remaining distance comprises:

obtaining, by an apparatus coupled to the ETCS terminal and via a vehicle network, a remaining distance to an ETCS payment location located within a preset area from a current location of the vehicle based on map information of a navigation device, or obtaining a remaining distance to an ETCS payment location located on a travel route based on travel route information to a destination obtained by the navigation device.

13. The control method of claim 12, wherein the ETCS payment location comprises at least one of a location of a tollgate or a location accepting ETCS payment.

14. The control method of claim 11, wherein the stopping of the ongoing card issuance operation comprises:

transmitting, by an apparatus coupled to the ETCS terminal and via a vehicle network, a card issuance stop request to stop issuing the new card to the ETCS terminal;

stopping, by the ETCS terminal, the ongoing card issuance operation, in response to receiving the card issuance stop request; and changing, by the ETCS terminal, the payment card to the card usable for payment from among cards stored in the card IC chip.

15. The control method of claim 11, wherein the stopping of the ongoing card deletion operation comprises:

transmitting, by an apparatus coupled to the ETCS terminal and via a vehicle network, a card deletion stop request to stop deleting the issued card;

stopping, by the ETCS terminal, the ongoing card deletion operation, in response to receiving the card deletion stop request; and changing, by the ETCS terminal, the payment card to the card usable for payment from among the cards stored in the card IC chip.

16. The control method of claim 11, wherein the stopping of the ongoing card issuance operation or the ongoing card deletion operation comprises:

based on receiving a card issuance stop request to stop issuing the new card or a card deletion stop request to stop deleting the issued card, controlling a communication interface coupled to a vehicle network to terminate a communication session for the ongoing card issuance operation or the ongoing card deletion operation.

17. The control method of claim 11, further comprising:

changing, by the ETCS terminal, the payment card of the ETCS terminal to the card usable for payment from among the cards stored in the card IC chip, and performing an ETCS payment process at an ETCS payment location using the card usable for payment.

18. The control method of claim 11, further comprising:

based on receiving payment completion information indicating completion of an ETCS payment process from the ETCS terminal, receiving, by an apparatus coupled to the ETCS terminal and via a vehicle network, first message information about the stopped card issuance operation or second message information about the stopped card deletion operation, and transmitting the first message information or the second message information to the ETCS terminal.

19. The control method of claim 18, further comprising:

resuming the stopped card issuance operation according to the first message information, or resuming the stopped card deletion operation according to the second message information.

20. The control method of claim 11, further comprising:

in response to receiving card change completion information indicating completion of a payment card change from the ETCS terminal, transmitting, by an apparatus coupled to the ETCS terminal via a vehicle network, a notification signal indicating the payment card change.

\* \* \* \* \*